(12) United States Patent
Chauvin

(10) Patent No.: US 8,460,488 B2
(45) Date of Patent: Jun. 11, 2013

(54) EYEGLASSES HOLDER CLIP

(76) Inventor: Keith Chauvin, Thibodeaux, LA (US)

( * ) Notice: Subject to any disclaimer, the term of this patent is extended or adjusted under 35 U.S.C. 154(b) by 790 days.

(21) Appl. No.: 12/592,359

(22) Filed: Nov. 24, 2009

(65) Prior Publication Data

US 2011/0119871 A1 May 26, 2011

(51) Int. Cl.
*B29C 65/54* (2006.01)
*G02C 3/04* (2006.01)
*G02C 11/00* (2006.01)
*G02C 5/14* (2006.01)
*A44B 99/00* (2010.01)

(52) U.S. Cl.
USPC .................. 156/60; 24/3.3; 24/3.12; 24/304; 351/112

(58) Field of Classification Search
USPC .............. 24/3.3, 3.5, 3.12, 11 HC, 11 R, 304; 351/112; 156/60
See application file for complete search history.

(56) References Cited

U.S. PATENT DOCUMENTS

| | | | |
|---|---|---|---|
| 1,779,015 A | 10/1930 | Schmitt | |
| 1,898,059 A | 2/1933 | McDonald | |
| 2,042,400 A | 8/1934 | Hon | |
| 1,973,648 A | 9/1934 | Nagel | |
| 2,097,371 A | 10/1937 | Hon | |
| 3,038,377 A | 6/1962 | Maxson | |
| 3,210,814 A | 10/1965 | Wolf | |
| 3,883,236 A | 5/1975 | Zipper | |
| 4,316,654 A | 2/1982 | Allen | |
| 4,903,375 A * | 2/1990 | DiFranco | 24/3.3 |
| 5,235,727 A * | 8/1993 | McCloskey | 24/3.3 |
| 5,278,591 A | 1/1994 | Trotter | |
| 5,969,788 A * | 10/1999 | Largura | 351/158 |
| 6,017,120 A | 1/2000 | McCormick | |
| 6,045,221 A | 4/2000 | Resendez, Sr. | |
| 6,059,410 A | 5/2000 | Wang | |
| 6,343,859 B1 * | 2/2002 | McCormick | 351/112 |
| 6,543,895 B2 | 4/2003 | Fukai | |
| 6,802,604 B2 * | 10/2004 | McCormick | 351/112 |
| 6,854,845 B1 | 2/2005 | Goldman et al. | |
| 6,886,934 B2 | 5/2005 | Asman et al. | |
| 7,677,722 B1 * | 3/2010 | Mednick et al. | 351/112 |
| D616,487 S * | 5/2010 | Riley | D16/330 |
| 2002/0149738 A1 * | 10/2002 | McCormick | 351/112 |
| 2005/0128430 A1 | 6/2005 | Uren | |
| 2009/0007388 A1 * | 1/2009 | Villeneuve | 24/3.3 |
| 2009/0089984 A1 | 4/2009 | Warren | |

* cited by examiner

*Primary Examiner* — Robert J Sandy
(74) *Attorney, Agent, or Firm* — Keaty Law Firm, LLC

(57) ABSTRACT

A holder clip having a planar body is secured to a temple piece of a pair of eyeglasses to allow a user to suspend and support the eyeglasses from a pocket, lapel, or other location on a garment. The holder clip can be secured by adhesive or flexible gripping fingers that are crimped around the temple piece.

3 Claims, 3 Drawing Sheets

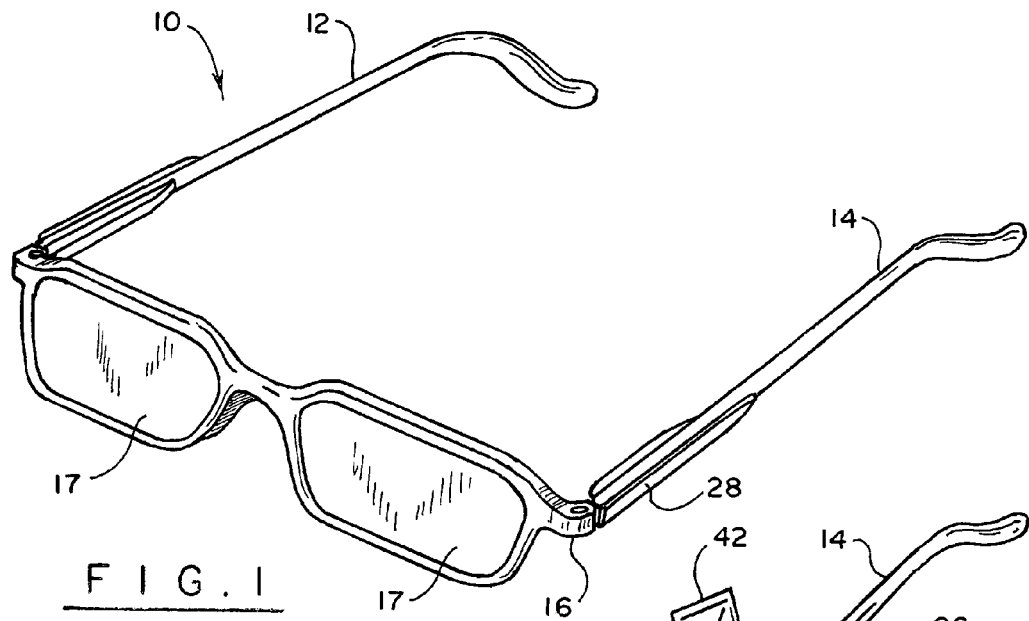
FIG. 1
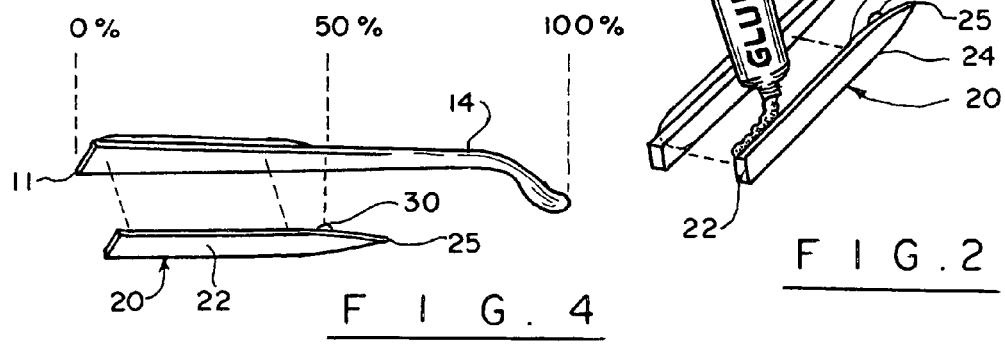
FIG. 2
FIG. 4
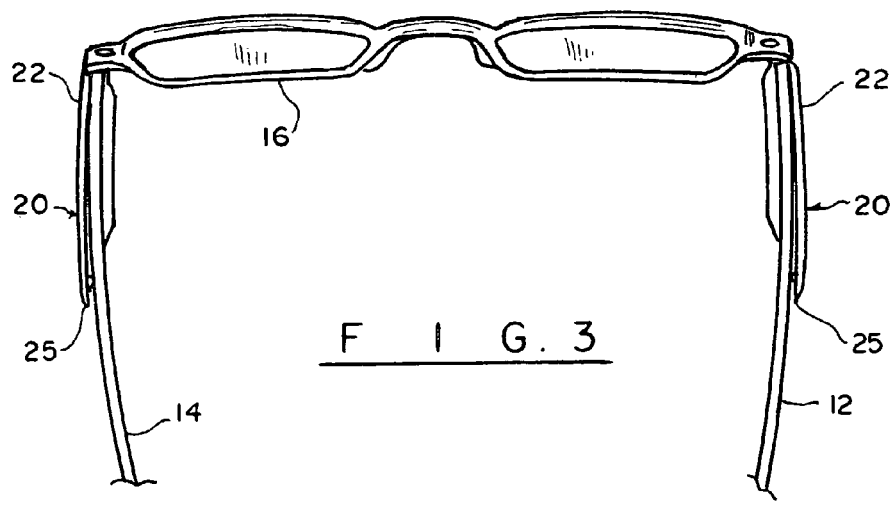
FIG. 3

EYEGLASSES HOLDER CLIP

BACKGROUND OF THE INVENTION

This invention relates to eyeglass holder clips for attaching eyeglass frames to user's garments, such as shirt pockets or shirt neck openings and methods of assembling same.

Many people wear eyeglasses only occasionally and take them off until they are needed again. Similarly, sunglasses are often taken off when the user moves indoors for a short period of time and then are replaced when the user comes outdoors. When the glasses are not needed, some people place them in their pockets and have to retrieve them when the need arises again. If the user's hands are soiled the garment becomes soiled from contact with user's hands. Additionally, the eyeglasses may break if placed in a pocket of a garment.

Other individuals use the temple piece of the eyeglasses to suspend the eyeglasses from the front of a shirt, from a pocket or other garment portion. However, the temple pieces are not designed to firmly engage the user's garment, as a result of which the eyeglasses often fall when the user bends over.

The industry developed different accessories for retaining the eyeglasses in the user's neck on a temporary basis. One of such widely used accessories is an elongated cord that has loops at both ends. The user wraps the cord around the neck and suspends the eyeglasses below the chin. The loops are configured to slide over the temple pieces and hold the glasses in a ready-to-use position. However, the eyeglasses are not secured in a stable position and move when the user moves or bends over.

Other suggested methods involve the use of clips that are permanently attached to the temple pieces at the time of manufacture; or slide-on clips that slide over the temple piece and allow suspension of the glasses from the clip. However, such methods increase the costs of the eyeglasses or make a cumbersome accessory, which prevents their wide use by the public.

The present invention contemplates elimination of drawbacks associated with the prior art and provision of a kit that can be used for attaching a clip to one or more of the temple pieces to allow the user to hold the eyeglasses clipped to the garment.

SUMMARY OF THE INVENTION

It is, therefore, an object of the present invention to provide eyeglass clip holder that is configured to secure the eyeglasses on a user's garment.

It is another object of the invention to provide a kit for attaching a clip holder to the frame of the eyeglasses.

It is a further object of the invention to provide a clip holder that can be attached to different frame types of the eyeglasses.

These and other objects of the invention are achieved through a provision of a holder clip having a planar body is secured to a temple piece of a pair of eyeglasses to allow a user to suspend and support the eyeglasses from a pocket, lapel, or other location on a garment. The holder clip can be secured by adhesive or flexible gripping fingers that are crimped around the temple piece. A kit for retrofitting the glasses may have a tube of adhesive or a small hand tool, such as for instance a pair of pliers, for use with the embodiment where the securing means comprises the bendable gripping fingers.

BRIEF DESCRIPTION OF THE DRAWINGS

Reference will now be made to the drawings, wherein like parts are designated by like numerals, and wherein FIG. 1 is a perspective view of eyeglasses with the holder clip secured thereon.

FIG. 2 is a detail view illustrating a step in the method of securing the holder clip to a temple piece.

FIG. 3 is a top view of the eyeglasses with the holder clips secured on both temple pieces.

FIG. 4 is a perspective view of a temple piece illustrating a step of selecting a location along the length of the temple piece for securing the holder clip.

DETAIL DESCRIPTION OF THE INVENTION

Figures 5, 6:
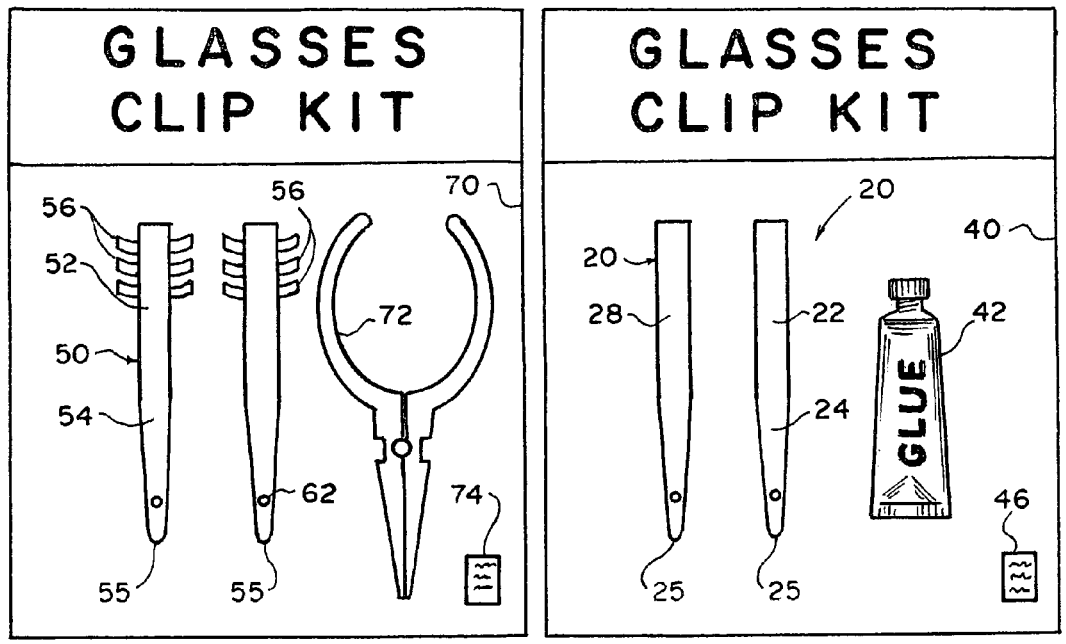
FIG. 5 is a plan view of an embodiment of a kit for holder clip adapted for use with metal frames.
FIG. 6 is a plan view of an embodiment of a kit for holder clip adapted for use with plastic frames.
Figures 7, 8:
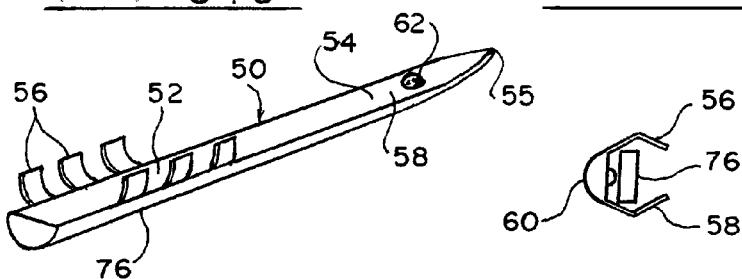
FIG. 7 is a detail view illustrating a holder clip for use with metal frames.
FIG. 8 is a detail view illustrating bending of the clip fingers around a metal temple piece.

Turning now to the drawings in more detail, numeral 10 designates a pair of eyeglasses that have the holder clip device 20 of the present invention attached thereto. The eyeglasses 10 comprises a pair of temple pieces 12 and 14, each of which is hingedly connected to the eyeglasses frame 16.

The holder clip device 20 comprises an elongated generally planar body having a securing portion 22 and a distant portion 24. A tip 25 of the distant portion 24 may have a narrow configuration to facilitate sliding of the distant portion 24 over a piece of a garment.

The holder clip 20 has an inner surface 26 and an outer surface 28. A wedge-shaped gripping bead 30 is affixed adjacent the tip 25 on the inner surface 26 of the holder clip device 20. The bead 30 is configured to press against an exterior of the garment piece when the holder clip 20 is positioned on the garment, as will be described in more detail below.

As can be seen in FIG. 6, a kit 40 according to the first embodiment of this invention comprises a pair of holder clips 20, a container 42 with an adhesive and an instruction sheet 46 that provides detail instructions to a user on how to secure the holder clips 20 on plastic temple pieces of a pair of eyeglasses. A drawing, similar to FIG. 4 is provided on the instruction sheet 46.

The instructions contained in the sheet 46 describe a method of attaching the holder clip device to the eyeglasses 10 and supporting the eyeglasses on the garment of the user. The user is advised to first select the correct position of the holder clip 20 to the temple piece 14. Depending on the thickness of the lenses 17, the center of balance of the eyeglasses 10 will change. It is suggested that that the user folds one of the temple pieces 12 or 14 and places the unfolded temple piece over a user's finger to find a balance point. It is envisioned that in the majority of applications, the securing portion would be adjacent to the hinge point 11 of a temple piece, while the gripping bead 30 would not extend far from the imaginary center line along the length of the temple piece.

In one aspect, the user is advised to mark the position for the securing portion 22 such that the bead 30 does not extend past an imaginary line dividing the length of the temple piece in half. The user is then instructed to squeeze a long bead of adhesive from the tube 42 sufficient to cover at least one-third length of the inner surface of the securing portion 22 of the holder clip (see FIG. 2). In the majority of applications, the layer of adhesive would not extend past the balance point.

The user then presses the adhesive-covered securing portion 22 to the outer surface of the temple piece this securing the holder clip 20 on the temple piece 12 or 14. The user then repeats the steps of depositing the adhesive and pressing the holder clip 20 to the other temple piece. The instruction sheet 46 also provides examples on how to support the eyeglasses with the attached clip holder on the garment of the user.

Turning now to the second embodiment of the invention illustrated in FIGS. 5 and 7-9, the holder clip 50 is seen to comprise a generally planar body having a securing portion 52 and a distant portion 54. A plurality of gripping fingers 56 extend from the securing portion 52 of the planar body. The gripping fingers 56 are spaced in a generally parallel relationship to each other. In one aspect the holder clip 50 comprises six gripping fingers—three on each side of the planar body. The gripping pieces are formed from a flexible bendable material, such as a metal alloy.

The holder clip 50 has an inner surface 58 and an outer surface 60. A gripping bead 62 is secured on the inner surface 58 adjacent a distant tip 55 of the distant portion 54. The tip 55 may be narrowed to facilitate positioning of the holder clip 50 on a user's garment.

Figure 9:
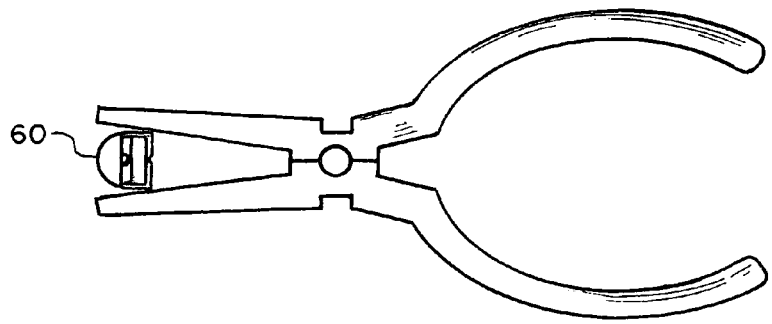
FIG. 9 is a detail view illustrating a step of crimping the fingers of the holder clip around a temple piece.

The kit 70 containing the holder clip of the second embodiment is provided with a hand-held tool, such as for instance small pliers 72, and a sheet of instructions 74. The user is guided step-by-step on how to mount the holder clip 50 on eyeglasses having metal temple pieces. The user is advised to find the balancing point in a manner similar to the steps described above in reference to the holder clip 20. The user is then instructed to place the inner surface of the holder clip 50 in contact with a wire temple piece 76 in the selected position along the length of the temple piece. The user is further instructed to bend and crimp the fingers 56 around the temple piece, as shown in FIG. 9, such that the gripping fingers 56 tightly frictionally engage the temple piece 14. The same procedure is followed for positioning of the second holder clip on the opposite temple piece.

Figure 13:
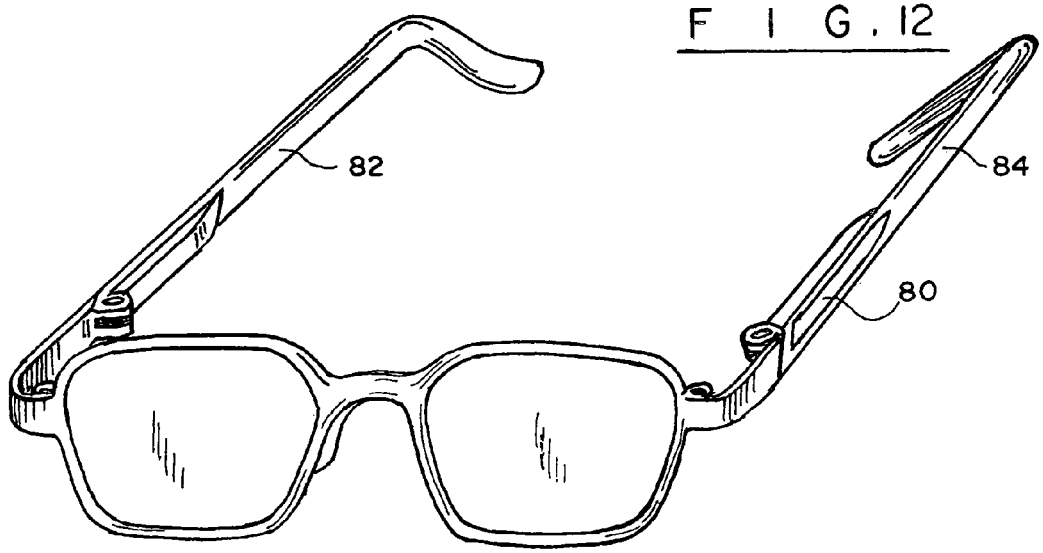
FIG. 13 is a perspective view of an embodiment of the holder clip adapted for use with wide plastic frames.

FIG. 13 illustrates a holder clip 80 particularly designed for use with wide temple pieces 82 and 84. In this embodiment, the holder clip 80 is mounted almost flush with the exterior surface of the temple pieces 82 and 84. The construction of the holder clip 80 is similar to the construction of the holder clip 20 except for the gripping bead, which is not used in this embodiment. The manner of securing the holder clip 80 to the temple piece is similar to the steps described above in reference to the holder clip 20.

Figure 10:
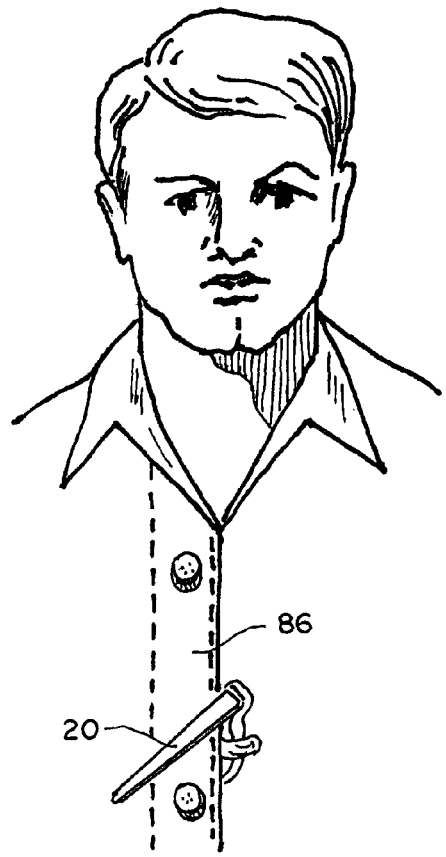
FIG. 10 illustrates position of the holder clip with an edge of a shirt.
Figure 11:
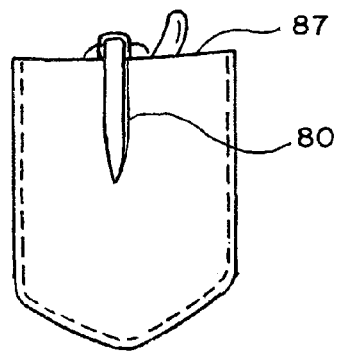
FIG. 11 illustrates position of the holder clip on a pocket of a garment.
Figure 12:
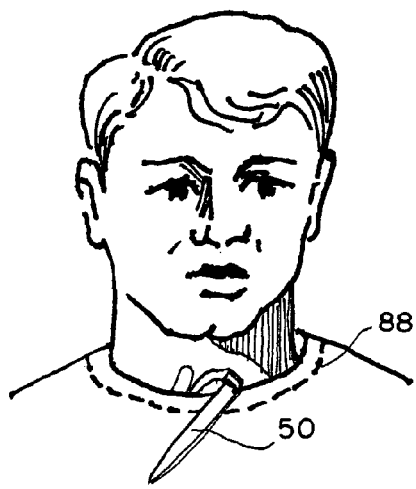
FIG. 12 illustrates position of the holder clip secured to a neck line of a garment.

When in use, the eyeglasses are positioned on the edge of a garment, such as a side of a shirt 86 (FIG. 10), the pocket 87 (FIG. 11) or a top 88 of the neck opening (FIG. 12). The cantilevered distant portion of the holder clips 20, 50 and 80 is tensioned to return to a close position relative to the temple piece. The holder clips 20, 50 and 80 extend on the outer side of the garment pressing against the garment in a spring fashion. The gripping beads 30 and 62 further assist in ensuring a tight grip on the cloth of the garment by the holder clips 20 and 50. The holder clips prevent the weight of the glasses from flipping over and out of ones pocket, or disengaging from lapel, etc. If desired the inner surfaces of the holder clip, particularly in the distant portion can be provided with ridges that also create a gripping contact with the garment. The holder clips exert sufficient pressure to hold the eyeglasses firmly and vertically in the pocket or on the lapel even if the wearer bends over, or in a stooping position.

The user can select the precise position of the holder clip depending on the weight of the glasses, the weight of the lenses and other factors. Expensive prescription glasses may be retrofitted using the kits of the holder clips of the present invention. If desired, the holder clip may be attached to only one of the temple pieces, depending whether the user is left-handed or right-handed. In this manner, the user has the convenience of positioning and removing the eyeglasses by the preferred hand.

The holder clip kits 40 and 70 may comprise more than a pair of holder clip, allowing the user to retrofit more than one pair of eyeglasses. Many other changes and modifications can be made in the design of the present invention without departing from the spirit thereof. I, therefore, pray that my rights to the present invention be limited to the scope of the appended claims.

I claim:

1. A method of supporting on a garment of a user a pair of eyeglasses having a first and a second temple pieces, the method comprising the steps of:
   providing at least one holder clip having a generally planar body;
   moving a first temple piece into a folded position;
   positioning the second temple piece in an unfolded position on a finger of the user to determine a point of balance of the eyeglasses;
   marking the point of balance on the second temple piece;
   securing the holder clip on the temple piece; and
   positioning the eyeglasses on the garment of the user such that an inner surface of the holder clip contacts exterior of the garment.

2. The method of claim 1, wherein said step of securing the holder clip to the temple piece comprises a step of applying a layer of adhesive along the securing portion of the holder clip adjacent the balance point and then pressing the layer of adhesive to the temple piece, thereby securing the holder clip on the temple piece.

3. The method of claim 1, wherein said at least one holder clip has a distant portion and said method further comprises a step of providing a gripping bead adjacent an end of the distant portion, and wherein said step of determining the balance point comprises a step of selecting a position of the holder clip such that the gripping bead is located adjacent a center point along the length of the temple piece.

\* \* \* \* \*